United States Patent [19]

Pringle

[11] 3,956,541

[45] May 11, 1976

[54] STRUCTURAL MEMBER OF PARTICULATE MATERIAL AND METHOD OF MAKING SAME

[75] Inventor: John Philip Pringle, Allen, Tex.

[73] Assignee: Capital Wire & Cable, Division of U. S. Industries, Plano, Tex.

[22] Filed: May 2, 1974

[21] Appl. No.: 466,242

[52] U.S. Cl. ............................ 428/2; 260/2.3; 264/109; 264/122; 264/DIG. 69; 428/326; 428/327; 428/338; 428/339
[51] Int. Cl.² .................. B65D 71/00; B32B 5/16
[58] Field of Search ........... 161/162, 168, 261, 401; 264/109, 122, DIG. 69; 260/9, 17.2, 17.3, 2.3; 428/2, 326, 327, 338, 339, 528, 506

[56] References Cited
UNITED STATES PATENTS

| | | | |
|---|---|---|---|
| 2,785,975 | 3/1957 | Sheeran | 260/17.2 |
| 2,789,935 | 4/1957 | Drummond et al. | 161/162 |
| 3,457,202 | 7/1969 | Hutchinson | 260/9 |
| 3,463,746 | 8/1969 | Murdock et al. | 260/9 |
| 3,546,143 | 12/1970 | Corbett | 260/9 |
| 3,560,324 | 2/1971 | Quackenbush | 161/162 |
| 3,573,155 | 3/1971 | Mitchell | 161/168 |
| 3,718,536 | 2/1973 | Downs et al. | 161/168 |
| 3,801,421 | 4/1974 | Allen et al. | 264/109 |

*Primary Examiner*—George F. Lesmes
*Assistant Examiner*—William R. Dixon, Jr.
*Attorney, Agent, or Firm*—Richards, Harris & Medlock

[57] ABSTRACT

A structural member is fabricated from a mixture of scrap particles of thermoplastic wire and cable insulation, wood particles, comminuted paper, sawdust, and a suitable resin binder. The fabrication procedure is carried out by initially forming a mixture of reclaimed thermoplastic wire or cable insulation, a thermosetting binder, and one or more wood like fillers, such as wood chips, comminuted paper and sawdust and mold release agent. The mixture is then placed in a mold and is subjected to heat and pressure to form a structural member.

8 Claims, 2 Drawing Figures

STRUCTURAL MEMBER OF PARTICULATE MATERIAL AND METHOD OF MAKING SAME

This invention relates to the use of scrap electrical wire and cable materials, and more particularly, to improvements in the reclamation and use of the thermoplastic insulation materials of wires and cables. In addition, this invention relates to molded structural members, and more particularly, to improvements in structural members molded from a mixture of particulate waste materials and a binder.

In many situations, large quantities of wire and cable having metallic conductors surrounded by thermoplastic insulation materials such as polyvinyl chloride, polyethylene, or the like, must be removed or replaced. Often, these wires and cables cannot be reused and must be scrapped. In view of the value of the metals used in the conductors of these wires and cables, attempts have been made to reclaim and reuse these metals. In accordance with the prior art, the insulation from these wires and cables is normally removed by oxidation such as by combustion. Since there was no obvious reasonable commercial use for these insulation materials, their destructive removal from the valuable conductor metals was not challenged, and has been widely used.

In addition, numerous processes have heretofore been used wherein scrap particulate substances such as wood chips, sawdust, comminuted paper, and the like, have been combined with a thermosetting binder and subjected to heat and pressure to fabricate various structural members. The scrap materials used in the fabrication of these products have made them economical to produce and readily accepted for many uses, such as concrete forms, structural elements, molded products, cores for laminated panels, and the like. These members have excellent strength in compression, but are normally extremely brittle.

The prior art has recorded various attempts to improve the properties of these molded structural members, but these processes have either increased the production costs to an uneconomical point, or have created other disadvantages in the members.

In accordance with the present invention, it has been discovered that if scrap thermoplastic insulation materials from electrical cables and wires are shredded and added to particulate wood materials, substantial improvements can be obtained in the physical characteristics of structural elements molded from this mixture.

More particularly, according to the present invention, an improved structural member of particulate material is fabricated from a first mixture of from about 30 to 60 weight percent of shredded scrap thermoplastic wire and cable insulation and about 70 to 40 weight percent of filler material such as wood chips, comminuted paper and sawdust. Next, a second mixture is formed by adding about 11 to 18 weight percent of the first mixture of phenolic resin binder and a small amount of zinc stearate mold release to the first mixture. The second mixture is placed in the mold and pressed from 75 to 350 psi, preferably from about 150 to 250 psi and heated to a temperature in the range from 250° to 450°F., preferably from about 300° to 350°F for 8 to 20 minutes to form a molded structural member.

The resulting structural member is economical to produce and exhibits a substantial decrease in its brittleness compared to conventional members.

For a more complete understanding of the present invention, reference may be had to the following detailed description when taken in conjunction with the accompanying Drawings in which.

Figure 1:
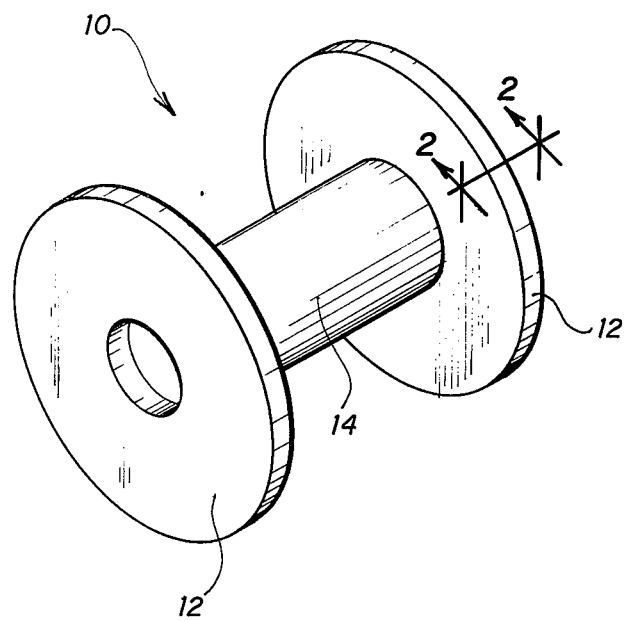
FIG. 1 is a perspective view of a cable reel.

Referring now to the Drawings wherein like reference characters designate like or corresponding parts throughout the several views, there is illustrated in FIG. 1, a cable reel 10 formed in accordance with the teachings of the present invention. It should be understood, of course, that the reel 10 is disclosed as an example to assist in describing the present invention, and that numerous other products could be fabricated in accordance with the teachings of the present invention.

The illustrated cable reel 10 has a pair of parallel flanges 12 and a barrel about which a length of cable, or the like, may be wrapped. The barrel 14 of the reel 10 is normally formed from a corrugated core and the flanges 12 are formed from a rigid material.

Due to the fact that these reels are used to store and transport lengths of heavy electrical cable, and the like, the reels and especially the flanges thereon must be durable and be able to withstand bending loads. To satisfy the needs in this environment, it is conventional to fabricate these flanges 12 from materials such as plywood, wood, or the like.

Although reels constructed from these conventional materials have been satisfactory for their purposes, they have not been entirely satisfactory because wood materials are steadily increasing in cost, thus causing the reels to be more expensive to produce. This is due, in part, to the fact that the flanges 12 are circular in shape, and wood material is normally supplied in a rectangular sheet, thus a substantial amount of these wood materials is wasted in the fabrication process. In an attempt to reduce the cost of these reels, the flanges were molded from conventional particle board materials containing wood particles and a binder. But, it was discovered that flanges formed from molded particle board did not prove satisfactory for the reason that the brittleness of these materials makes them unacceptable in service.

To solve this problem, the present invention teaches the fabrication of these flanges (and other structural elements with similar requirements) from scrap materials so that the resultant product is inexpensive to produce and more durable than conventional particle board products.

To form the flanges 12 of the present invention, large quantities of scrap cable and wire having thermoplastic insulation thereon, such as polyvinyl chloride, polyethylene, or the like, is cut into small lengths and placed in a hammer mill for shredding. The material is then forced through a quarter-inch grid grate to remove the insulation materials from the conductors. Thereafter, the insulation materials are separated from the metallic conductor materials by an air and gravity separator.

After separation of the insulation particles, the particles have an average size of about an eighth of an inch, but can range up to ½ inch maximum dimension. Preferably in excess of 50% of the total thermoplastic particles by weight are in the range of 1/16 to ¼ maximum dimension. Because the particles are formed in a hammer mill, the particle size is random, but it is to be understood, of course, that the primary quantity of the particles will have the average ⅛ inch greater dimension.

The particulate insulation material is next combined to form a first mixture with a filler material such as wood scrap material which can comprise wood chips, comminuted paper, sawdust, and the like. This wood scrap material can be formed by passing larger pieces of wood and scraps through a grinder and using the resultant product therefrom. The size of the wood filler can range frm sawdust to larger splinters, and the like. Preferably in excess of 50% of the total wood fiber particles by weight are in the range of ⅛ to ⅜ maximum dimension. In either case, the particles of thermoplastic insulation and filler are limited in maximum size only by practical considerations of molding and handling of the particles. It is to be understood, of course, that the particles can be no larger than the minimum dimensions of the member to be molded or than can be handled by the molding equipment.

This first mixture is then combined with a suitable thermosetting binder to form a second mixture. The thermosetting binder may be selected from the conventional thermosetting materials available such as, phenolic resin, urea-formaldehyde, or the like. In addition, a mold release material may be added to the mixture. The mold release agent is completely conventional and may be for example zinc stearate, calcium stearate, or the like. The entire mixture is then placed in a mold and subjected to heat and pressure to fabricate a flange 12.

The resulting flange 12 is flexible when compared to ordinary particle boards and is more durable. It is also inexpensive in that scrap wood and particles of scrap cable insulation form a primary portion of the material. The improved strength and durability of the fabricated material is believed to be a result of the unique combination of the particulate thermoplastic insulation material with the wood particles. It is believed that the thermoplastic insulation material softens and melts to form discrete plastic zones within the material which conforms and bonds to adjacent particles under the heat and pressure of the fabrication process. This adds flexibility to the structural members formed in this manner.

Figure 2:
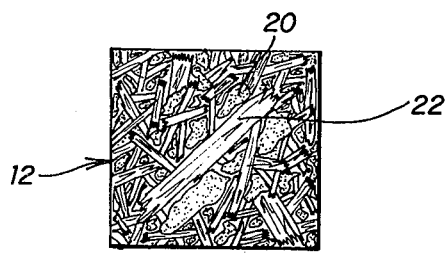
FIG. 2 is an enlarged partial section of a flange of the reel taken on line 2—2 of FIG. 1, looking in the direction of the arrows.

This material is best illustrated in FIG. 2 wherein the discrete zones 20 of thermoplastic insulation material are shown dispersed within the wood particles 22, and the like. The formation of the discrete zones 20 of thermoplastic material is important, and it is believed that these zones flex readily to increase the flexibility of the flanges 12.

In this regard, it is believed important that the particles of thermoplastic material must be large enough to form these discrete zones 20 in the finished product. Although the optimum particle size has not been determined, it is known that particles randomly formed with an average maximum dimension of one-eighth of an inch function well.

More specifically, the material of the flange 12 can be fabricated by initially forming a first mixture which comprises preferably from about 30 to 60 weight percent of the particulate thermoplastic scrap from discarded wire cable insulation with preferably from about 70 to 40 weight percent of filler material such as wood chips, comminuted paper and sawdust. The plastic material has an average maximum dimension particle size of ⅛ of an inch. Next, a second mixture is formed by adding from about 11 to 18 weight percent base material of a phenolic resin binder and a small amount of zinc stearate mold release agent to the first mixture.

The resultant second mixture will thus comprise about 27 to 51 percent by weight of thermoplastic material, about 34 to 63 percent by weight of filler material, 10 to 15 percent by weight of binder and a small amount of mold release agent.

This second mixture is then placed in a mold where it is pressed at about 150 to 250 psi and heated to a temperature in the range of 300° to 350° F. for 8 to 20 minutes to form a molded cable flange in accordance with the present invention.

Exemplary of a particular preferred specific embodiment is a mixture of 13 weight percent standard phenolic molding resin; 18 weight percent of scrap particulate thermoplastic cable insulation with an average greater dimension of ⅛ of an inch; 69 weight percent of wood filler material with an average greater dimension of ½ inch; and a small amount of zinc stearate mold release agent which is molded at 350°F. for 18 minutes at a pressure of 150 psi.

The thermoplastic scrap may be of any kind used for insulation, of which polyvinyl chloride, polyethylene, and the like, are most common.

Experiments have been conducted within the range specified which determined that the higher the percentage of plastic scrap material added to the composition, the more flexible the resultant products will be. The lower the percentage of the plastic insulation materials, the less flexible the materials will be.

It is important to recognize that a significant aspect of the present invention is that the improved particle board of the present invention could be formed in accordance with the teachings of the present invention by the use of thermoplastic materials derived from other sources than from the reclamation of the insulation of the electrical wires and cables. It is also important to recognize that another significant aspect of Applicant's invention is the provision of a reasonable commercial use for the insulation from wires and cables to produce an improved product.

It is to be understood, of course, that the foregoing disclosure relates only to one specific embodiment and that the invention could be practiced to form many structural members. It is also to be understood that alterations and modifications could be made without departing from the spirit and scope of the invention as set forth in the appended claims.

I claim:
1. A structural member comprising in combination:
   a. a first component comprising a mixture of:
      1. 30 to 60 weight percent of particulate membeers of scrap thermoplastic wire and cable insulation material randomly distributed throughout said member; and
      2. 70 to 40 percent of particulate wood filler material filling the spaces between said thermoplastic members; and
   b. a second component added to said first component, comprising an effective quantity of thermosetting resin binder materials interattaching said thermoplastic and said wood filler materials to form a structural member.
2. The structural member of claim 1 wherein said thermoplastic members have an average maximum dimension of ⅛ of an inch.

3. The structural member of claim 1 wherein the binder is phenolic resin.

4. The structural member of claim 1 wherein 11 to 18 weight percent of binder is added to said first component.

5. A structural member comprising in combination:
   a. a first component comprising a mixture of:
      1. 30 to 60 weight percent of particulate members of scrap thermoplastic wire and cable insulation material randomly distributed through said member, 50 percent of said thermoplastic particles by weight being 1/16 to ¼ of an inch maximum dimension; and
      2. 70 to 40 weight percent of particulate wood filler material filling the spaces between said thermoplastic particles, 50 percent by weight of said wood particles being ⅛ to ⅜ of an inch maximum dimension; and
   b. a second component added to said first component, comprising an effective quantity of thermosetting resin binder material attaching said thermoplastic and said wood filler materials to form a structural member.

6. The structural member of claim 5 wherein said binder is phenolic resin.

7. The structural member of claim 5 wherein 11 to 18 weight percent of said binder is added to said first component.

8. A structural member comprising in combination:
   a. 21 to 51 weight percent of particulate members of scrap thermoplastic wire and cable insulation material randomly distributed through said member, 50 percent by weight of said thermoplastic particles being 1/16 to ¼ inch maximum dimension;
   b. 34 to 63 weight percent of particulate wood filler material filling the spaces between said thermoplastic members, 50 percent by weight of said wood filler particles being ⅛ to ⅜ of an inch maximum dimension; and
   c. 10 to 15 weight percent phenolic resin binder materials interattaching said thermoplastic materials and said wood filler to form a structural member.

\* \* \* \* \*